(12) United States Patent
Kawai

(10) Patent No.: US 9,365,656 B2
(45) Date of Patent: Jun. 14, 2016

(54) PROCESS FOR PRODUCING MODIFIED POLYMER, DIENE POLYMER, RUBBER COMPOSITION AND PNEUMATIC TIRE

(71) Applicant: TOYO TIRE & RUBBER CO., LTD., Osaka-shi, Osaka (JP)

(72) Inventor: Nobutomo Kawai, Osaki (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 58 days.

(21) Appl. No.: 14/370,373

(22) PCT Filed: Feb. 6, 2013

(86) PCT No.: PCT/JP2013/000643
§ 371 (c)(1),
(2) Date: Jul. 2, 2014

(87) PCT Pub. No.: WO2013/118496
PCT Pub. Date: Aug. 15, 2013

(65) Prior Publication Data
US 2014/0364536 A1    Dec. 11, 2014

(30) Foreign Application Priority Data

| Feb. 10, 2012 | (JP) | 2012-027374 |
| Feb. 10, 2012 | (JP) | 2012-027376 |
| Dec. 27, 2012 | (JP) | 2012-285759 |
| Dec. 27, 2012 | (JP) | 2012-285765 |

(51) Int. Cl.
| *C08C 19/08* | (2006.01) |
| *C08K 3/00* | (2006.01) |
| *C08G 81/02* | (2006.01) |
| *C08F 136/08* | (2006.01) |
| *C08F 236/10* | (2006.01) |
| *C08K 3/04* | (2006.01) |
| *C08K 3/36* | (2006.01) |

(52) U.S. Cl.
CPC .............. *C08C 19/08* (2013.01); *C08F 136/08* (2013.01); *C08F 236/10* (2013.01); *C08G 81/022* (2013.01); *C08K 3/0033* (2013.01); *C08K 3/04* (2013.01); *C08K 3/36* (2013.01)

(58) Field of Classification Search
CPC ...................................................... C08C 19/08
USPC .......................................................... 523/155
See application file for complete search history.

(56) References Cited

U.S. PATENT DOCUMENTS

| 3,931,357 A | 1/1976 | Meyer et al. |
| 5,622,998 A | 4/1997 | Tanaka et al. |
| 6,133,388 A | 10/2000 | Lee et al. |
| 2004/0266937 A1 | 12/2004 | Yagi et al. |
| 2007/0010610 A1 | 1/2007 | Kondo |
| 2009/0275675 A1 | 11/2009 | Yagi et al. |
| 2010/0184893 A1 | 7/2010 | Ignatz-Hoover |
| 2011/0028653 A1* | 2/2011 | Wang ......................... C08F 8/00 525/207 |
| 2011/0112212 A1 | 5/2011 | Kimura et al. |
| 2012/0323037 A1* | 12/2012 | Pilard ..................... C08C 19/08 560/262 |

FOREIGN PATENT DOCUMENTS

| JP | 47-39183 A | 12/1972 |
| JP | 49-093488 A | 9/1974 |
| JP | 62-39644 A | 2/1987 |
| JP | 08-081505 A | 3/1996 |
| JP | 11-209517 A | 8/1999 |
| JP | 2000-248014 A | 9/2000 |
| JP | 2004-359716 A | 12/2004 |
| JP | 2004-359773 A | 12/2004 |
| JP | 2005-041960 A | 2/2005 |
| JP | 2005-232261 A | 9/2005 |
| JP | 2007-217562 A | 8/2007 |
| JP | 2009-138157 A | 6/2009 |
| JP | 2010-526185 A | 7/2010 |
| JP | 2010-275386 A | 12/2010 |
| JP | 2011-508069 A | 3/2011 |
| JP | 2011-173986 A | 9/2011 |
| JP | 2013-010873 A | 1/2013 |
| WO | 2009/072650 A1 | 6/2009 |
| WO | WO 2011/101551 | * 8/2011 |

OTHER PUBLICATIONS

Notice of Examination Opinion dated Sep. 6, 2015, issued in counterpart Chinese Patent Application No. 201380008778.0 w/English translation (8 pages).
Notice of Reasons for Refusal dated Jun. 9, 2015, issued in corresponding Japanese Patent Application No. 2012-027376 with English translation (5 pages).
International Search Report, dated Apr. 9, 2013, issued in corresponding application No. PCT/JP2013/000643.
Kamimura, Shigehisa, et al., "Polymer Scrambling between Polyisoprene from Natural Rubber and Polyester Derived from Olefin-containing Dicarboxylic Acid", The Society of Polymer Science, Japan, Polymer preprints, Japan, 2010, vol. 59, No. 1, pp. 352, w/English translation.

\* cited by examiner

*Primary Examiner* — Doris Lee
(74) *Attorney, Agent, or Firm* — Westerman, Hattori, Daniels & Adrian, LLP

(57) ABSTRACT

A polymer having a carbon-carbon double bond in a main chain is decomposed by subjecting the carbon-carbon double bond to oxidative cleavage using an oxidizing agent such as periodic acid to decrease the molecular weight, polymer chains of the decomposed polymer are combined by changing acido-basic properties such that a system containing the decomposed polymer becomes basic when acidic and becomes acidic when basic, and a modified polymer in which the structure has been changed is obtained. By this, a functional group can be incorporated in the main chain structure of a polymer. A rubber composition comprising a rubber component containing the modified polymer, and a filler compounded therewith, and a pneumatic tire comprising the rubber composition are provided.

20 Claims, No Drawings

PROCESS FOR PRODUCING MODIFIED POLYMER, DIENE POLYMER, RUBBER COMPOSITION AND PNEUMATIC TIRE

TECHNICAL FIELD

The present invention relates to a process for producing a modified polymer, a diene polymer, a rubber composition using the diene polymer, and a pneumatic tire.

BACKGROUND ART

Modification technology of a polymer is known as a technology for modifying characteristics of natural polymer such as natural rubber, and a synthesized polymer. For example, modification of a terminal structure to a synthetic rubber such as styrene-butadiene rubber, addition modification on a main chain, modification method in a polymerization step, and the like are proposed (see PTLs 1 to 7 listed below). Furthermore, because natural rubber is a natural product, a modification method of directly adding a functional group to a side chain or adding a functional group by grafting a polymer is proposed as a technology for changing the characteristics thereof (see PTLs 8 to 12 listed below).

Such a modified polymer is used as, for example, a rubber component in a rubber composition. Generally, in a rubber composition, a diene rubber is used as a rubber component, and a filler such as carbon black or silica is compounded with the rubber component. To improve properties of such a rubber composition, the modified polymer described above is used as a rubber component.

Various modification methods are proposed as above, but a modification method in which a functional group is easily incorporated in a main chain structure is not known, regardless of a solution polymerization or an emulsion polymerization.

PTL 13 listed below discloses a depolymerized natural rubber useful as an adhesive, a pressure-sensitive adhesive, a sealing agent, a caulking agent, a plasticizer and the like. In PTL 13, a liquid depolymerized natural rubber having a number average molecular weight of from 2,000 to 50,000 is produced by subjecting a deproteinized natural rubber dissolved in an organic solvent to air oxidation in the presence of a metal catalyst to depolymerize the deproteinized natural rubber. PTL 13 discloses that a main chain is decomposed by air oxidation to form a molecular chain having a carbonyl group at one terminal and a formyl group at other terminal, and the formyl group is recombined by aldol condensation. However, in PTL 13, the depolymerization is conducted in a solution of an organic solvent, and PTL 13 does not disclose that the recombination is performed by changing a system containing a decomposed polymer to basicity from acidity or to acidity from basicity. Furthermore, PTL 13 is to obtain a telechelic liquid rubber having carbonyl groups at both terminals, and has an object to obtain a liquid rubber by decomposing a natural rubber into low molecules. For this reason, in PTL 13, a polymer is not modified by recombining a main chain structure while controlling without extremely decreasing a molecular weight.

NPL 1 listed below discloses a composite of a polyester having a carbon-carbon double bond in a main chain and polyisoprene derived from a natural rubber by a main chain exchange reaction. However, the technique disclosed in NPL 1 is performed by an olefin cross metathesis reaction, and requires a metal catalyst such as Grubbs catalyst, and control of a reaction system is not generally easy.

CITATION LIST

Patent Literature

PTL 1: JP-A-2000-248014
PTL 2: JP-A-2009-138157
PTL 3: JP-A-H11(1999)-209517
PTL 4: JP-A-2007-217562
PTL 5: JP-A-2010-275386
PTL 6: WO 2009/072650
PTL 7: JP-A-2011-173986
PTL 8: JP-A-S62(1987)-039644
PTL 9: JP-A-2005-232261
PTL 10: JP-A-2004-359773
PTL 11: JP-A-2005-041960
PTL 12: JP-A-2004-359716
PTL 13: JP-A-H08(1996)-081505

Non-Patent Literature

NPL 1: Shigehisa Kamimura, et al., "Polymer Scrambling between Polyisoprene from Natural Rubber and Polyester Derived from Olefin-containing Dicarboxylic Acid", The Society of Polymer Science, Japan, Polymer preprints, Japan Vol. 59, No. 1 (2010), p 352

SUMMARY OF INVENTION

Technical Problem

One embodiment has an object to provide a novel modification method of a polymer. In more detail, the embodiment provides a process for producing a modified polymer, that can easily incorporate a functional group in a main chain structure. Other embodiment has an object to provide a novel diene polymer having a functional group incorporated in a main chain structure thereof. Still other embodiment has an object to provide a rubber composition containing the diene polymer, and a pneumatic tire using the rubber composition.

Solution to Problem

A process for producing a modified polymer according to an embodiment comprises decomposing a polymer having a carbon-carbon double bond in a main chain by subjecting the carbon-carbon double bond to oxidative cleavage to decrease a molecular weight, and combining polymer chains of the decomposed polymer by changing acido-basic properties such that a system containing the decomposed polymer becomes basic (that is, alkaline) when acidic, and becomes acidic when basic, and obtaining a modified polymer in which the structure has been changed.

In the above production process, the decomposed polymer may contain a structure represented by the following formula (1) at a terminal.

(1)

In the formula, $R^1$ represents a hydrogen atom, an alkyl group having from 1 to 5 carbon atoms, or a halogen group.

A diene polymer according to an embodiment has at least one linking group selected from the group consisting of linking groups represented by the following formulae (2) to (5) in the molecule, and has a structure in which diene polymer chains are linked through the linking group.

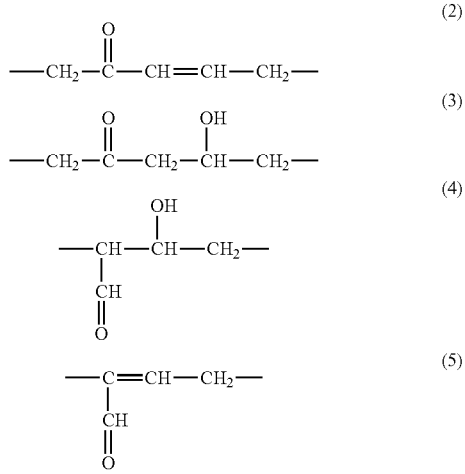

A rubber composition according to an embodiment comprises 100 parts by mass of a rubber component containing the diene polymer, and from 5 to 150 parts by mass of a filler.

A pneumatic tire according to an embodiment comprises the rubber composition.

Advantageous Effects of Invention

According to the production process of the above embodiment, a polymer in which the structure has been changed can be produced by decomposing a polymer by subjecting a carbon-carbon double bond in a main chain thereof to oxidative cleavage to decrease its molecular weight, and then recombining by making a system containing the polymer acidic or basic. Furthermore, a functional group can be incorporated in a connection point when recombining. Thus, the functional group can be easily incorporated in a main chain structure.

DESCRIPTION OF EMBODIMENTS

A process for producing a modified polymer according to an embodiment comprises decomposing a polymer having a carbon-carbon double bond in a main chain by subjecting the carbon-carbon double bond to oxidative cleavage to decrease its molecular weight, and recombining decomposed polymers by making a system containing the decomposed polymers acidic or basic, thereby preparing a modified polymer in which the structure has been changed.

In the present embodiment, a polymer having a carbon-carbon double bond in a repeating unit of a main chain can be used as the polymer to be modified. Such polymers include various diene polymers, and preferably diene rubber polymers, and other than those, include unsaturated polyesters, unsaturated polyols, unsaturated polyurethanes, polyalkyne compounds and unsaturated fatty acids.

The diene polymer is a polymer obtained by using a conjugated diene compound such as butadiene, isoprene, chloroprene, 2,3-dimethyl-1,3-butadiene, 2-methyl-1,3-pentadiene or 1,3-hexadiene as at least a part of monomers. Those diene compounds may be used in any one kind, and may be used as mixtures of two kinds or more.

The diene polymer further includes a copolymer of a conjugated diene compound and a monomer other than the conjugated diene compound. Examples of the other monomer include various vinyl compounds such as aromatic vinyl compounds such as styrene, α-methylstyrene, 2-methylstyrene, 3-methylstyrene, 4-methylstyrene and 2,4-diisopropylstyrene; ethylene, propylene, isobutylene, acrylonitrile and acrylic ester. Those vinyl compounds may be used in any one kind or as mixtures of two kinds or more.

The diene rubber polymer includes various rubber polymers having at least one selected from the group consisting of an isoprene unit, a butadiene unit and a chloroprene unit in the molecule (preferably isoprene unit and/or butadiene unit), and examples thereof include natural rubber (NR), synthetic isoprene rubber (IR), butadiene rubber (BR), styrene-butadiene rubber (SBR), nitrile rubber (NBR), chloroprene rubber (CR), butyl rubber (IIR), styrene-isoprene copolymer rubber, butadiene-isoprene copolymer rubber and styrene-isoprene-butadiene copolymer rubber. Of those, styrene-butadiene rubber, natural rubber, synthetic isoprene rubber or butadiene rubber is preferably used.

The polymer to be modified may be used in one kind alone or as mixtures of two kinds or more. In one embodiment, in the case of using two kinds or more of polymers as the polymer to be modified, a main chain exchange reaction can be conducted between two kinds or more of polymers, and a composite polymer containing different kinds of polymer chains is obtained. The combination of polymers in this case is not particularly limited. Preferably, at least one kind is a diene polymer. More preferably, at least one kind is diene rubber polymer. Sill more preferably, at least one kind is styrene-butadiene rubber, natural rubber, synthetic isoprene rubber or butadiene rubber. Two kinds or more of diene polymers may be used, and two kinds or more of diene rubber polymers may be used. As one embodiment, styrene butadiene rubber, and natural rubber and/or synthetic isoprene rubber may be combined.

A polymer having a number average molecular weight of 60,000 or more is preferably used as the polymer to be modified. The reason for this is that a polymer in a solid state at the ordinary temperature (23° C.) is intended to use in a preferred embodiment. For example, for that a rubber polymer does not undergo plastic deformation in a state of not applying force at the ordinary temperature in directly processing the rubber polymer as a material, the number average molecular weight is preferably 60,000 or more. Where the number average molecular weight is smaller than 60,000, a viscosity is low, making it difficult to mold the rubber polymer as a processed product. The term "solid state" used herein means the state free of flowability. The number average molecular weight of the polymer is preferably from 60,000 to 1,000,000, more preferably from 80,000 to 800,000, and still more preferably from 100,000 to 600,000. The number average molecular weight may be from 100,000 to 500,000.

A polymer dissolved in a solvent can be used as the polymer to be modified. Preferably, an aqueous emulsion in which the polymer is present as a micelle state in water as a protic solvent, that is, a latex, is used. When the aqueous emulsion is used, after decomposing the polymer, a recombination reaction can be induced by changing acido-basic properties of a reaction field while maintaining the state. The concentration of the aqueous emulsion (solid concentration of a polymer) is not particularly limited. The concentration is preferably from 5 to 70 mass %, and more preferably from 10 to 50 mass %.

When the solid concentration is set to such a range, micelle is suppressed from being easily destroyed due to pH fluctuation of a reaction field, stability of the emulsion can be enhanced, and practical reaction rate can be secured.

To subject a carbon-carbon double bond in a polymer to oxidative cleavage, an oxidizing agent can be used. For example, the oxidative cleavage can be performed by adding an oxidizing agent to the aqueous emulsion of the polymer, followed by stirring. Examples of the oxidizing agent include manganese compounds such as potassium permanganate and manganese oxide; chromium compounds such as chromic acid and chromium trioxide; peroxides such as hydrogen peroxide; perhalogen acids such as periodic acid; and oxygens such as ozone and oxygen. Of those, periodic acid is preferably used. Use of periodic acid makes it easy to control a reaction system. Furthermore, since a water-soluble salt is formed, when the modified polymer is solidified and dried, the water-soluble salt can remain in water, and the amount of residual water-soluble salt in the modified polymer is small. In performing the oxidative cleavage, a metal oxidation catalyst, for example, a salt or a complex between a metal such as cobalt, copper or iron, and a chloride or an organic compound, may be concurrently used. For example, air oxidation may be conducted in the presence of the metal oxidation catalyst.

In the case of subjecting two kinds or more of polymers to oxidative cleavage, each polymer may be subjected to the oxidative cleavage by adding an oxidizing agent in a separate system, respectively. Alternatively, two kinds or more of polymers are previously mixed, and those polymers may be subjected at once to the oxidative cleavage by adding an oxidizing agent to the mixed system.

The polymer is decomposed by the oxidative cleavage, and polymers having a carbonyl group (>C=O) or a formyl group (—CHO) at a terminal (the polymers are hereinafter referred to as polymer fragments) are obtained. As one embodiment, the polymer fragments have the structure represented by the above formula (1) at the terminal.

In the formula (1), $R^1$ represents a hydrogen atom, an alkyl group having from 1 to 5 carbon atoms, or a halogen group, and more preferably a hydrogen atom, a methyl group or a chloro group. For example, in the case where an isoprene unit is cleaved, $R^1$ is a methyl group at one cleavage terminal, and $R^1$ is a hydrogen atom at other cleavage terminal. In the case where a butadiene unit is cleaved, IV is a hydrogen atom at both cleavage terminals. In the case where a chloroprene unit is cleaved, $R^1$ is a chloro group at one cleavage terminal, and $R^1$ is a hydrogen atom at other cleavage terminal. In more detail, the decomposed polymers (that is, polymer fragments) have the structure represented by the above formula (1) in at least one terminal of a molecular chain thereof. That is, a polymer having the group represented by the formula (1) directly bonded to one terminal or both terminals of a diene polymer chain is formed, as shown in the following formulae (6) and (7).

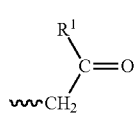

(6)

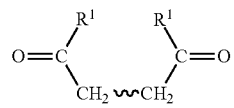

(7)

In the formulae (6) and (7), $R^1$ represents a hydrogen atom, an alkyl group having from 1 to 5 carbon atoms, or a halogen group, and a portion indicated by a wavy line is a diene polymer chain. For example, in the case of decomposing natural rubber, the portion indicated by a wavy line is a polyisoprene chain comprising a repeating structure of an isoprene unit. In the case of decomposing styrene-butadiene rubber, the portion indicated by a wavy line is a random copolymer chain containing a styrene unit and a butadiene unit.

When the polymer is decomposed by the oxidative cleavage, a molecular weight thereof is decreased. The number average molecular weight of the polymer after decomposition is not particularly limited. The number average molecular weight is preferably from 300 to 500,000, more preferably from 500 to 100,000, and still more preferably from 1,000 to 50,000. The amount of functional groups after recombination can be adjusted by a size of a molecular weight after decomposition. Where the molecular weight when decomposed is too small, a combining reaction is liable to occur in the same molecule.

After decomposing the polymer as above, decomposed polymers formed are recombined by making a reaction system containing the decomposed polymers acidic or basic. That is, after the decomposition, acido-basic properties are changed in the state as it is. In the embodiment of using two kinds or more of polymers as the polymer to be modified, in the case where two kinds or more of polymers have been separately subjected to oxidative cleavage, those are mixed, and acido-basic properties of a mixed solution are changed to recombine those polymers. On the other hand, in the case where two kinds or more of polymers are previously mixed and then subjected to oxidative cleavage, after the decomposition the acido-basic properties of a reaction field are changed in the state as it is, thereby recombining those polymers.

Thus, by changing acido-basic properties, a combining reaction which is a reverse reaction from cleavage proceeds preferentially. That is, the oxidative cleavage is a reversible reaction, and the cleavage reaction proceeds preferentially than a combining reaction which is a reverse reaction. Therefore, a molecular weight is decreased until reaching equilibrium. In this case, when the acido-basic properties are reversed, the combining reaction proceeds preferentially. As a result, the molecular weight which has been once decreased turns into an increase, and the molecular weight is increased until reaching equilibrium. As a result, a modified polymer having a desired molecular weight is obtained. The structure of the above formula (1) has two kinds of tautomerism, and is classified into a structure which bonds to the original carbon-carbon double bond, and a structure which forms linking groups represented by the above formulae (2) to (5). In the present embodiment, an aldol condensation reaction has a priority by controlling pH of a reaction field, and a polymer containing at least one linking group of the formulae (2) to (5) can be generated. In detail, in a solution of a reaction system, particularly an aqueous emulsion, pH is controlled for stabilization, and the pH at the time of decomposition shifts to either acidity or basicity depending on a method used in decomposition or a kind or concentration of a chemical. Therefore, in the case where the reaction system at the time of decomposition is acidic, the reaction system is rendered to be basic. On the other hand, in the case where the reaction system at the time of decomposition is basic, the reaction system is rendered to be acidic.

In the case where polymers having a terminal structure in which $R^1$ is a hydrogen atom are bonded to each other, a linking group represented by the formula (4) is formed by an aldol condensation reaction, and a linking group represented by the formula (5) is formed by eliminating water from the linking group of the formula (4). In the case where a polymer having a terminal structure in which $R^1$ is a hydrogen atom is bonded to a polymer having a terminal structure in which $R^1$ is a methyl group, an linking group represented by the formula (3) is formed by an aldol condensation reaction, and a linking group represented by the formula (2) is formed by eliminating water from the linking group of the formula (3). There is a case where a linking group other than the above formulae (2) to (5) is formed, such as the case where polymers having a terminal structure in which $R^1$ is a methyl group are bonded to each other. However, the amount of such a linking group is slight, and the linking groups of the formulae (2) to (5) are mainly formed.

In the case where the reaction system is rendered to be basic, the pH of a reaction system in conducting a combining reaction is larger than 7, preferably from 7.5 to 13, and more preferably from 8 to 10. On the other hand, in the case where the reaction system is rendered to be acidic, the pH is smaller than 7, preferably from 4 to 6.8, and still more preferably from 5 to 6. In making acidic conditions; it is preferred that acidity is not excessively increased for suppressing micelle in a latex from destruction. The adjustment of pH can be conducted by adding an acid or a base to a reaction system. Although not particularly limited, examples of the acid include hydrochloric acid, sulfuric acid, nitric acid and phosphoric acid, and examples of the base include sodium hydroxide, potassium hydroxide, sodium carbonate and sodium hydrogen carbonate.

In conducting the combining reaction, an acid or base for adjusting pH becomes a catalyst of the combining reaction, and pyrrolidine-2-carboxylic acid may be used as a catalyst for further adjusting the reaction.

After completion of the combining reaction as above, a modified polymer in a solid state at the ordinary temperature is obtained by coagulating and drying the aqueous emulsion.

According to the present embodiment, by conducting the combining reaction as described above, the linking groups represented by the formulae (2) to (5) are incorporated in a main chain, and a modified polymer in which the structure has been changed is obtained. That is, the modified polymer according to the embodiment has, in the molecule, at least one linking group selected from the group of the linking groups represented by the formulae (2) to (5) and has a structure in which polymer chains are directly linked through the linking group. Therefore, the modified polymer has a structure in which when any of linking groups represented by the formulae (2) to (5) is X and a polymer chain (preferably a diene polymer chain) is Y, a structure represented by —Y—X—Y— is contained in the molecule and the linking group X and the polymer chain Y are generally alternately repeated. The polymer chain Y at both sides of X may be the same kind or different kind.

The (diene) polymer chain used herein is a molecular chain which is a part of a molecular chain of the (diene) polymer to be modified. For example, in the case of a homopolymer of a conjugated diene compound, when a constituent unit comprising the conjugated diene compound is $A^1$, the diene polymer chain has a repeating structure of $A^1$ represented by $-(A^1)_n-$ (n is an integer of 1 or more, preferably from 10 to 10,000, and more preferably from 50 to 1,000). In the case of a binary copolymer, when each constituent unit is $A^1$ and $A^2$ (at least one of $A^1$ and $A^2$ is a unit comprising a conjugated diene compound, and other unit includes a unit comprising the vinyl compound), the diene polymer chain has a repeating structure of $A^1$ and $A^2$ represented by $-(A^1)_n-(A^2)_m-$ (Those are a random type or a block type. n and m each are an integer of 1 or more, preferably from 10 to 10,000, and more preferably from 50 to 1,000). In the case of a ternary copolymer, when each constituent unit is $A^1$, $A^2$ and $A^3$ (at least one of $A^1$, $A^2$ and $A^3$ is a unit comprising a conjugated diene compound, and other unit includes a unit comprising the vinyl compound), the diene polymer chain has a repeating structure of $A^1$, $A^2$ and $A^3$ represented by $-(A^1)_n-(A^2)_m-(A^3)_p-$ (Those may be a random type or a block type. n, m and p each are an integer of 1 or more, preferably from 10 to 10,000, and more preferably from 50 to 1,000, respectively.). Quaternary or more copolymers are the same.

In one embodiment, the modified polymer may be a modified isoprene rubber in which at least one linking group selected from the group of the linking groups represented by the formulae (2) to (5) is present in the molecule and polyisoprene chains represented by the following formula (8) are linked through the linking group.

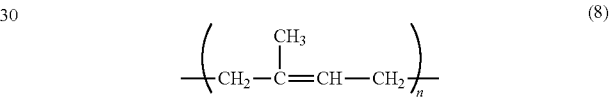

(8)

The modified isoprene rubber is the case where natural rubber or synthetic isoprene rubber is used as the polymer to be modified, and has the polyisoprene chain comprising a repeating structure of an isoprene unit as the diene polymer chain. In the formula (8), n is an integer of 1 or more, preferably from 10 to 10,000, and more preferably from 50 to 1,000.

In one embodiment, the modified polymer may be a modified styrene-butadiene rubber in which at least one linking group selected from the group of the linking groups represented by the formulae (4) and (5) is present in the molecule and random copolymer chains represented by the following formula (9) are linked through the linking group.

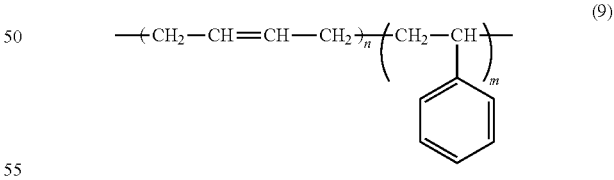

(9)

The modified styrene-butadiene rubber is the case that styrene-butadiene rubber is used as the polymer to be modified, and has a styrene-butadiene copolymer chain represented by the formula (9) containing a styrene unit and a butadiene unit, as the diene polymer chain. In the formula (9), n and m are independently an integer of 1 or more, preferably from 10 to 10,000, and more preferably from 50 to 1,000.

The dine polymer chain contained in the modified polymer may be a polybutadiene chain represented by the following formula (10), in addition to the above-described polyisoprene chain and styrene-butadiene copolymer chain. That is, in the case of using polybutadiene rubber as the polymer to be modified, a modified butadiene rubber in which at least one linking group selected from the group of the linking groups represented by the formulae (4) and (5) is present in the molecule and the polybutadiene chains are linked through the linking group is obtained. In the formula (10), n is an integer of 1 or more, preferably from 10 to 10,000, and more preferably from 50 to 1,000.

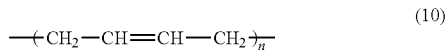

$$-\!\!\!+\!\!CH_2-CH=\!\!CH-\!CH_2\!\!+\!\!_n \qquad (10)$$

The diene polymer chain is preferably a diene rubber polymer chain such as the polyisoprene chain, the styrene-butadiene copolymer chain or the polybutadiene chain.

In the embodiment of using two kinds or more of polymers as the polymer to be modified, the modified polymer has a structure in which polymer chains derived from different kinds of polymers are linked through the linking group. That is, the modified polymer is a composite polymer containing polymer chains derived from two kinds or more of polymers. However, the combining reaction occurs not only between different kinds of polymer fragments, but between the same kind of polymer fragments. Therefore, the modified polymer generally also has a structure in which the same kind of polymer chains are linked through the linking group, and therefore has a structure in which a linking structure between the same kind of polymer chains and a linking structure between the different kinds of polymer chains are mixed.

As one embodiment, the different kinds of the diene polymer chains preferably contain at least one of the polyisoprene chain represented by the formula (8), the random copolymer chain represented by the formula (9) or the polybutadiene chain represented by the formula (10). That is, a combination of the polyisoprene chain and other diene polymer chain, a combination of the random copolymer chain and other diene polymer chain, a combination of the polybutadiene chain and other diene polymer chain, and a combination of at least two kinds of the polyisoprene chain, the random copolymer chain or the polybutadiene chain are included. To achieve the combinations, two kinds or more of diene polymers containing at least one of natural rubber and/or synthetic rubber, the styrene-butadiene rubber or the butadiene rubber are used as the polymer to be modified. The modified polymer more preferably has a structure in which at least two kinds selected from the group consisting of the polyisoprene chain, the random copolymer chain and the polybutadiene chain are linked through the linking group. To achieve the structure, at least two kinds selected from the group consisting of isoprene rubber (that is, natural rubber or synthetic isoprene rubber), styrene-butadiene rubber and butadiene rubber are combined and used as two or more of diene rubber polymers to be modified. More preferred combination is a combination of isoprene rubber and styrene-butadiene rubber, or a combination of isoprene rubber and butadiene rubber.

At least one of the linking groups is contained in one molecule of the modified polymer, and a plurality of the linking groups is generally contained in one molecule. In the case of containing a plurality of the linking groups, a plurality of any one kind of the linking groups represented by the formulae (2) to (5) may be contained, and two kinds or more of the linking groups may be contained. The content of the linking group is not particularly limited. The total content of the linking groups of the formulae (2) to (5) is preferably from 0.001 to 25 mol %, more preferably from 0.1 to 15 mol %, and still more preferably from 0.5 to 10 mol %. The content (modification ratio) of the linking group is a ratio of mole number of a linking group to mole number of the whole constituent units constituting the modified polymer. For example, in the case of natural rubber, the content is a ratio of mole number of a linking group to the total of mole numbers of the whole isoprene unit and the linking group in the modified polymer. In the case of styrene-butadiene rubber, the content is a ratio of mole number of a linking group to the total of mole numbers of the butadiene unit, styrene unit and linking group in the modified polymer. In the case of a composite polymer of natural rubber and styrene-butadiene rubber, the content is a ratio of mole number of a linking group to the total of mole numbers of the isoprene unit, the butadiene unit, the styrene unit and the linking group in the modified polymer.

The content of each linking group represented by the formulae (2) to (5) is not particularly limited, but is preferably 25 mol % or less (that is, from 0 to 25 mol %). For example, in the case of natural rubber and synthetic isoprene rubber (that is, the case that the diene polymer chain has an isoprene unit), all of the linking groups represented by the formulae (2) to (5) is generally contained, but the linking group represented by the formula (2) is mainly contained. In this case, the content of the linking group represented by the formula (2) is preferably from 0.001 to 20 mol %, more preferably from 0.05 to 10 mol %, and still more preferably from 0.5 to 5 mol %. In the case of styrene-butadiene rubber (that is, the case that the diene polymer chain contains only a butadiene unit as a conjugated diene compound), the linking groups represented by the formulae (4) and (5) are generally contained, but the linking group represented by the formula (5) is mainly contained. In this case, the content of the linking group represented by the formula (5) is preferably from 0.001 to 20 mol %, more preferably from 0.05 to 10 mol %, and still more preferably from 0.5 to 5 mol %.

The modified polymer according to the embodiment is preferably a solid state at the ordinary temperature (23° C.). To achieve this, the number average molecular weight of the modified polymer is not particularly limited, but is preferably 60,000 or more, more preferably from 60,000 to 1,000,000, still more preferably from 80,000 to 800,000, and further more preferably from 100,000 to 600,000, and may be from 100,000 to 500,000. Thus, the molecular weight of the modified polymer is preferably set to the same molecular weight as the original polymer by recombining as described above. By this, a functional group can be incorporated in the main chain of a polymer without decreasing a molecular weight while avoiding adverse influence to properties. Of course, a modified polymer having a molecular weight smaller than that of the original polymer may be obtained. The weight average molecular weight of the modified polymer is not particularly limited, but is preferably 70,000 or more, more preferably from 100,000 to 2,000,000, still more preferably from 100,000 to 1,500,000, and particularly preferably from 300,000 to 1,000,000.

According to the present embodiment, a polymer is decomposed by subjecting a double bond in a main chain to oxidative cleavage to once decrease a molecular weight, and acido-basic properties of a reaction system are then changed to perform recombination, thereby forming a modified polymer. Therefore, the modified polymer can be converged to more homogeneous structure by monodispersion of a polymer. That is, the molecular weight distribution of the modified polymer can make small than the molecular weight distribution of the original polymer. This is considered to be due to that the polymers decomposed by oxidative cleavage have high reactivity and are liable to recombine as the polymers become short, and a molecular weight is homogenized by the decrease in short polymers.

According to the present embodiment, the reaction for oxidative cleavage can be controlled by adjusting a kind and amount of an oxidizing agent that is a chemical for dissociating a double bond, a reaction time, and the like. Furthermore, the combining reaction can be controlled by adjusting pH, a catalyst, a reaction time, and the like when recombining. The molecular weight of the modified polymer can be controlled by those controls. As a result, the number average molecular weight of the modified polymer can be set equal to that of the original polymer, and can be set lower than that of the original polymer.

In decomposing the polymer main chain and recombining, the linking group described above is inserted as a structure different from the main chain, and a bonding point of a segment of the main chain structure converts into a functional group. That is, a structure having high reactivity and a structure that is liable to change parameters of a polymer structure are incorporated in a molecular main chain. Thus, the method of the present embodiment is not grafting, direct addition and ring opening, but changes the main chain structure itself of a polymer, and can easily incorporate a functional group in the main chain structure, apparently differing from the conventional modification method. Furthermore, to natural polymer such as natural rubber, a modified polymer having a novel structure can be produced by rearranging its main chain structure, and characteristics of the polymer can be changed.

According to the embodiment using two kinds or more of polymers as the polymer to be modified, a modified polymer having a structure in which polymer chains have been mutually exchanged and rearranged between different kinds of polymers is obtained. Additionally, a main chain exchange reaction of a high molecular weight substance can be conducted without using a metal catalyst. Furthermore, even though two kinds or more of polymers to be modified have different molecular weight, monodispersion is intended by decomposing and recombining those polymers, and a modified polymer having a uniform length in a certain degree can be obtained. Thus, modified polymers having block arrangement in which main chains have been exchanged between different kinds of polymers can be obtained with a uniform length in a certain degree. For this reason, the modified polymer can have the same phase structure as in a block copolymer, not a structure having a matrix phase and a dispersed phase that have been separated to each other, like a sea-island structure obtained by a polymer blend, and as a result, various characteristics can be exhibited.

The modified polymer according to the present embodiment can be used as a polymer component in various polymer compositions. Although not particularly limited, it is preferred that a modified diene rubber obtained by modifying diene rubber is obtained, and the modified diene rubber is used as a rubber component in various rubber compositions. The intended use of the rubber composition is not particularly limited, and the rubber composition can be used in various rubber members for tires, vibration-proof rubbers, belt conveyers and the like.

When the modified polymer is the modified diene rubber, compatibility or dispersibility with a filler is improved by changing an interaction (intermolecular force, polarity or reactivity) between the polymer and the filler and by changing the composition of the polymers. By the effect, in the case of using the modified diene rubber, for example, in a rubber composition for a tire, improvement in low fuel consumption and improvement in tensile characteristic are observed, and particularly, reinforcement, wet skid perfo mance and rolling resistance performance that are important in the compounding for a tire tread can be concurrently achieved in high level.

In the case of the embodiment of using two kinds or more of polymers as the polymer to be modified, properties can be improved in a uniform structure by selecting two kinds or more of polymers to be modified. That is, the conventional polymer blend involves macrophase separation and localization of a filler due to the difference in polarity between polymers, and therefore has a non-uniform structure. However, in the present embodiment, improvement in properties is possible in a uniform structure. Therefore, the modified rubber of the present embodiment can be utilized in the effect of viscoelasticity, adjustment of relaxation to load (reduction in noise), and rigidity control of an air-free tire or the like. Furthermore, the modified rubber can be utilized in regeneration of a rubber.

In the rubber composition of the embodiment, the rubber component may be the modified diene rubber alone and may be a blend of the modified diene rubber and other rubber. The other rubber is not particularly limited, and examples thereof include various diene rubbers such as natural rubber (NR), synthetic isoprene rubber (IR), butadiene rubber (BR), styrene-butadiene rubber (SBR), nitrile rubber (NBR), butyl rubber (IIR) and halogenated butyl rubber. Those can be used alone or as mixtures of two kinds or more thereof. The content of the modified diene rubber in the rubber component is not particularly limited. The content is preferably 10 parts by mass or more, more preferably 30 parts by mass or more, and still more preferably 50 parts by mass or more, per 100 parts by mass of the rubber component.

Filler can be compounded with the rubber composition according to the embodiment. Examples of the filler that can be used include various inorganic fillers such as silica, carbon black, titanium oxide, aluminum silicate, clay and talc. Those can be used alone or as mixtures of two kinds or more thereof. Of those, silica and/or carbon black are preferably used.

The silica is not particularly limited, and includes wet silica (hydrous silicic acid) and dry silica (anhydrous silicic acid). Of those, wet silica is preferably used. Colloidal characteristics of silica are not particularly limited. Silica having nitrogen adsorption specific surface area (BET) by BET method of from 150 to 250 $m^2/g$ is preferably used. Silica having BET of from 180 to 230 $m^2/g$ is more preferably used. The BET of silica is measured according to BET method described in ISO 5794.

Carbon black is not particularly limited. Various grades of furnace carbon black, such as SAF, ISAF, HAF and FEF, that are used as a reinforcing agent for a rubber can be used alone or as mixtures of two kinds or more thereof.

The compounding amount of the filler is from 5 to 150 parts by mass, preferably from 20 to 120 parts by mass, and still more preferably from 30 to 100 parts by mass, per 100 parts by mass of the rubber component.

Although not particularly limited, in the case of using the modified isoprene rubber as the modified diene rubber, carbon black is preferably compounded as the filler. In the case of using the modified isoprene rubber obtained by modifying natural rubber or synthetic isoprene rubber, use of carbon black as the filler exerts larger effect in the improvement in compatibility as compared with the case of using silica. For this reason, in the case of using the modified isoprene rubber, carbon black alone or a combination of carbon black and silica is preferably used. The carbon black is compounded in an amount of preferably from 5 to 80 parts by mass, and more preferably from 20 to 80 parts by mass, per 100 parts by mass of the rubber component.

In the case of using the modified styrene-butadiene rubber as the modified diene rubber, silica is preferably compounded as the filler. In the case of the modified styrene-butadiene rubber, use of silica as the filler exerts larger effect in the improvement of compatibility as compared with the case of using carbon black. For this reason, in the case of using the modified styrene-butadiene rubber, silica alone or a combination of silica and carbon black is preferably used. The silica is compounded in an amount of preferably from 5 to 80 parts by mass, and more preferably from 20 to 80 parts by mass, per 100 parts by mass of the rubber component.

In the case of compounding silica as the filler, a silane coupling agent such as sulfide silane or mercaptosilane may be compounded with the rubber composition to further enhance dispersibility of silica. The compounding amount of the silane coupling agent is not particularly limited. The compounding amount is preferably from 2 to 20 mass % based on the compounding amount of silica.

Other than the above-described components, various additives such as an oil, zinc flower, stearic acid, an age resister, a wax, a vulcanizing agent and a vulcanization accelerator that are generally used in a rubber composition can be compounded with the rubber composition.

Examples of the vulcanizing agent include sulfur and a sulfur-containing compound (for example, sulfur chloride, sulfur dichloride, high molecular polysulfide, morpholine disulfide and alkyl phenol disulfide). Those are used in any of one kind alone or as mixtures of two kinds or more thereof. The compounding amount of the vulcanizing agent is not particularly limited. The compounding amount is preferably from 0.1 to 10 parts by mass, and more preferably from 0.5 to 5 parts by mass, per 100 parts by mass of the rubber component.

Examples of the vulcanization accelerator that can be used include various vulcanization accelerators of sulfenamide type, thiuram type, thiazole type or guanidine type. Those can be used in any of one kind alone or as mixtures of two kinds or more thereof. The compounding amount of the vulcanization accelerator is not particularly limited. The compounding amount is preferably from 0.1 to 7 parts by mass, and more preferably from 0.5 to 5 parts by mass, per 100 parts by mass of the rubber component.

The rubber composition according to the embodiment can be produced by kneading according to the conventional methods using a mixing machine such as Banbury mixer, a kneader or rolls, that are generally used. That is, in a first mixing stage, other additives excluding a vulcanizing agent and a vulcanization accelerator, together with a filler are added to and mixed with the rubber component, and in a final mixing stage, a vulcanizing agent and a vulcanization accelerator are added to and mixed with the mixture obtained. Thus, a rubber composition can be prepared.

The rubber composition thus obtained can be applied to various uses such as a large-sized tire of a passenger car, a truck and a bus, and each site of a tire, such as a tread part, a sidewall part, a bead part and a rubber for covering a tire cord of a pneumatic tire. That is, the rubber composition can produce a pneumatic tire by forming into a predetermined shape by extrusion processing, combining with other parts, and then vulcanization molding at a temperature of, for example, from 140 to 180° C. Of those, the rubber is particularly preferably used as compounding for a tread of a tire.

The intended use of the modified polymer according to the present embodiment is not limited to a rubber composition, and the modified polymer can be used as a material in various fields, for example, a device material such as an electronic circuit element.

EXAMPLES

Examples of the present invention are described below, but it should be understood that the invention is not construed as being limited those examples.

Each measurement method is as follows.

[Number Average Molecular Weight (Mn), Weight Average Molecular Weight (Mw) and Molecular Weight Distribution (Mw/Mn)]

Mn, Mw and Mw/Mn in terms of polystyrene were obtained by the measurement with gel permeation chromatography (GPC). In detail, 0.2 mg of a sample was dissolved in 1 mL of THF, and was used as a measurement sample. Using "LC-20DA" manufactured by Shimadzu Corporation, the sample was passed through a filter and then passed through a column ("PL Gel 3 µm Guard×2" manufactured by Polymer Laboratories) at a temperature of 40° C. in a flow rate of 0.7 mL/min, followed by detection with "RI Detector" manufactured by Spectra System.

[Content of Linking Group]

The content of a linking group was measured by NMR. NMR spectrum was measured using TMS as a standard by "400 ULTRASHIELD™ PLUS" manufactured by BRUKER. 1 g of a polymer was dissolved in 5 mL of deuteriochloroform, 87 mg of acetylacetochromium salt was added as a relaxation reagent, and measurement was conducted in NMR 10 mm tube.

Regarding the linking group of the formula (2), a peak of carbon having a ketone group attached thereto is present at 195 ppm in $^{13}$C-NMR. Regarding the linking group of the formula (3), a peak of carbon having a ketone group attached thereto is present at 205 ppm in $^{13}$C-NMR. Regarding the linking group of the formula (4), a peak of carbon having a ketone group attached thereto is present at 200 ppm in $^{13}$C-NMR. Regarding the linking group of the formula (5), a peak of carbon having a ketone group attached thereto is present at 185 ppm in $^{13}$C-NMR. Therefore, the amount (mole number) of structure was determined by a ratio of each peak of those peaks to a base polymer component. Regarding the formula (4), in the case where a terminal ketone (the structure of the formula (1)) appears, it overlaps the peak of carbon (200 ppm). Therefore, the amount of terminal ketone was quantitatively determined by the following method, and removed. That is, the peak of proton attached to a ketone group appears at 9.0 ppm by $^1$H-NMR. Therefore, a residual amount was determined by a ratio to a base polymer component.

Regarding mole number of each unit in a base polymer component, the mole number of an isoprene unit was calculated based on peaks of carbon on the opposite side of a double bond from a methyl group and hydrogen bonded to the carbon (=CH—), that is, 122 ppm by $^{13}$C-NMR and 5.2 ppm by $^1$H-NMR. Regarding the styrene-butadiene copolymer chain, the mole number was calculated based on peaks of five carbons in a phenyl group of a styrene unit excluding a carbon bonded to the main chain and five hydrogens bonded to five carbons, that is, 125 to 130 ppm by $^{13}$C-NMR and 7.2 ppm by $^1$H-NMR (because peaks of five portions, divided by 5). Furthermore, in the present embodiment, the amount of styrene in the styrene-butadiene rubber latex to be modified was 21.76 mass %. Therefore, the mole numbers of the styrene unit and the butadiene unit were calculated from the proportion of the styrene amount calculated above.

[pH]

The pH was measured using a portable pH meter "HM-30P Series", manufactured by DKK-TOA Corporation.

First Example

Example 1

Synthesis of Modified Polymer A

Natural rubber latex ("LA-NR" manufactured by Regitex Co., Ltd., DRC (Dry Rubber Content)=60 mass %) was used as the polymer to be modified. Molecular weight of unmodified natural rubber contained in the natural rubber latex was measured. As a result, a weight average molecular weight was 1,510,000, a number average molecular weigh was 269,000, and a molecular weight distribution was 5.6.

3.3 g of periodic acid ($H_5IO_6$) was added to 100 g of the mass of a polymer in the natural rubber latex having DRC adjusted to 30 mass %, followed by stirring at 23° C. for 3 hours. Thus, by adding periodic acid to a polymer in an emulsion state, followed by stirring, a double bond in the polymer chain was oxidatively decomposed, and a polymer containing the structure represented by the formula (1) was obtained. The decomposed polymer obtained had a weight average molecular weight of 5,200, a number average molecular weight of 2,500, and a molecular weight distribution of 2.1. Furthermore, pH of a reaction liquid after the decomposition was 6.2.

Thereafter, 0.1 g of pyrrolidine-2-carboxylic acid as a catalyst was added, and 1N sodium hydroxide was added such that pH of the reaction liquid becomes 10, followed by stirring at 23° C. for 12 hours to conduct the reaction. Solid content was reprecipitated in methanol, washed with water, and dried at 30° C. for 24 hours by a hot air circulation type drier. Thus, modified polymer A in a solid state at the ordinary temperature was obtained.

Thus, by adding sodium hydroxide to the oxidatively decomposed reaction system and forcedly changing the reaction system to basicity, the recombination reaction can be preferential while neutralizing the effect of periodic acid added in conducting the oxidative cleavage, and modified natural rubber (modified polymer A) containing the linking groups represented by the formulae (2) to (5) was obtained. Pyrrolidine-2-carboxylic acid was used as a catalyst, but is a material for accelerating a reaction, and the reaction proceeds without pyrrolidine-2-carboxylic acid.

The modified polymer A obtained was that as shown in Table 1 below, a weight average molecular weight Mw is 790,000, a number average molecular weight Mn is 304,000, a molecular weight distribution Mw/Mn is 2.6, the content of the linking group is 1.03 mol % for the formula (2), 0.26 mol % for the formula (3) and 0.03 mol % for the formula (5), and the total content is 1.32 mol %. Thus, the modified polymer A had a number average molecular weight nearly equivalent to that of the unmodified natural rubber. Furthermore, the modified polymer A had the molecular weight distribution smaller than that of the unmodified natural rubber, and was excellent in uniformity.

Examples 2 to 4

Synthesis of Modified Polymers B to D

Modified polymers B to D in a solid state were synthesized in the same manner as in Example 1, except that the reaction time during the oxidative decomposition, the addition amount of periodic acid, the pH regulator when added during the recombination reaction, pH and the amount of the catalyst were changed as shown in Table 1 below. Mw, Mn, Mw/Mn and the content of each linking group of the modified polymers B to D obtained are shown in Table 1. In the modified polymers B to D, the linking groups having a functional group were incorporated in the main chain, the molecular weight distribution was smaller than that of the unmodified natural rubber, and uniformity was excellent. Furthermore, by changing the above conditions, the molecular weight could be controlled.

Comparative Example 1 in Table 1 is unmodified natural rubber obtained by directly coagulating and drying the natural rubber latex ("LA-NR" manufactured by Regitex Co., Ltd., DRC (Dry Rubber Content)=60 mass %) without modification.

Examples 5 to 8

Synthesis of Modified Polymers E to H

Styrene-butadiene latex ("SBR Latex LX110, DRC=50 mass %, manufactured by Zeon Corporation) was used as the polymer to be modified. Molecular weight of unmodified styrene-butadiene rubber contained in the rubber latex was measured. As a result, a weight average molecular weight was 680,000, a number average molecular weight was 324,000, and a molecular weight distribution was 2.1. Using the styrene-butadiene rubber latex, modified polymers E to H in a solid state were synthesized in the same manner as in Example 1, except for the conditions shown in Table 1. Mw, Mn, Mw/Mn and the content of each linking group of the modified polymers E to H obtained are shown in Table 1. In the modified polymers E to H, only the formulae (4) and (5) were incorporated as the linking group. Furthermore, the modified polymers E to H had a molecular weight distribution smaller than that of unmodified styrene-butadiene rubber, and had excellent uniformity. The molecular weight could be controlled by changing the conditions.

Comparative Example 2 in Table 1 is unmodified styrene-butadiene rubber obtained by directly coagulating and drying the styrene-butadiene rubber latex without modification.

Examples 9 to 13

Synthesis of Modified Polymers I to M

Synthetic isoprene rubber latex ("SEPOLEX IR-100" manufactured by Sumitomo Seika Chemicals Co., Ltd., DRC-65 mass %) was used as the polymer to be modified. Molecular weight of unmodified synthetic isoprene rubber contained in the rubber latex was measured. As a result, a weight average molecular weight was 83,000, a number average molecular weight was 66,000, and a molecular weight distribution was 1.3. Using the synthetic isoprene rubber latex, modified polymers I to M in a solid state were synthesized in the same manner as in Example 1, except for the conditions shown in Table 1. Mw, Mn, Mw/Mn and the content of each linking group of the modified polymers I to M obtained are shown in Table 1. In the modified polymers I to M, the linking group having a functional group could be incorporated in the main chain. Furthermore, the molecular weight could be controlled by changing the conditions.

Comparative Example 3 in Table 1 is unmodified synthetic isoprene rubber obtained by directly coagulating and drying the synthetic isoprene rubber latex without modification.

TABLE 1

| | Before modification | | | Oxidative decomposition reaction conditions | | | After decomposition | | | |
|---|---|---|---|---|---|---|---|---|---|---|
| | Mw (×10$^5$) | Mn (×10$^5$) | Mw/Mn | Temperature (°C.) | Amount of periodic acid (g) | Reaction time | Mw (×10$^3$) | Mn (×10$^3$) | Mw/Mn | pH |
| Example 1, modified polymer A (NR raw material) | 15.1 | 2.69 | 5.6 | 23 | 3.3 | 3 hours | 5.2 | 2.5 | 2.1 | 6.2 |
| Example 2, modified polymer B (NR raw material) | 15.1 | 2.69 | 5.6 | 23 | 3.3 | 6 hours | 2.7 | 1.4 | 1.9 | 6.2 |
| Example 3, modified polymer C (NR raw material) | 15.1 | 2.69 | 5.6 | 23 | 1.1 | 6 hours | 10 | 3.0 | 3.4 | 8.0 |
| Example 4, modified polymer D (NR raw material) | 15.1 | 2.69 | 5.6 | 23 | 3.3 | 6 hours | 2.7 | 1.4 | 1.9 | 6.2 |
| Comparative Example 1, unmodified NR | 15.1 | 2.69 | 5.6 | — | — | — | — | — | — | — |
| Example 5, modified polymer E (SBR raw material) | 6.8 | 3.24 | 2.1 | 23 | 3.3 | 3 hours | 3.6 | 2.4 | 1.5 | 5.9 |
| Example 6, modified polymer F (SBR raw material) | 6.8 | 3.24 | 2.1 | 23 | 3.3 | 6 hours | 2.4 | 1.7 | 1.4 | 6.0 |
| Example 7, modified polymer G (SBR raw material) | 6.8 | 3.24 | 2.1 | 23 | 1.1 | 6 hours | 8.9 | 5.2 | 1.7 | 8.5 |
| Example 8, modified polymer H (SBR raw material) | 6.8 | 3.24 | 2.1 | 23 | 3.3 | 6 hours | 2.4 | 1.7 | 1.4 | 6.0 |
| Comparative Example 2, unmodified SBR | 6.8 | 3.24 | 2.1 | — | — | — | — | — | — | — |
| Example 9, modified polymer I (IR raw material) | 0.83 | 0.66 | 1.3 | 23 | 3.3 | 3 hours | 1.1 | 0.9 | 1.2 | 5.8 |
| Example 10, modified polymer J (IR raw material) | 0.83 | 0.66 | 1.3 | 23 | 3.3 | 6 hours | 0.7 | 0.6 | 1.1 | 5.8 |
| Example 11, modified polymer K (IR raw material) | 0.83 | 0.66 | 1.3 | 23 | 1.1 | 6 hours | 3.6 | 3.0 | 1.2 | 8.2 |
| Example 12, modified polymer L (IR raw material) | 0.83 | 0.66 | 1.3 | 23 | 3.3 | 6 hours | 0.7 | 0.6 | 1.1 | 5.8 |
| Example 13, modified polymer M (IR raw material) | 0.83 | 0.66 | 1.3 | 23 | 4.0 | 12 hours | 0.3 | 0.3 | 1.1 | 6.8 |
| Comparative Example 3, unmodified IR | 0.83 | 0.66 | 1.3 | — | — | — | — | — | — | — |

| | Recombination reaction condition | | | | |
|---|---|---|---|---|---|
| | Temperature (°C.) | Amount of pyrrolidine-2-carboxylic acid (g) | pH regulator | Reaction time (hours) | pH |
| Example 1, modified polymer A (NR raw material) | 23 | 0.1 | NaOH (1N) | 12 | 10 |
| Example 2, modified polymer B (NR raw material) | 23 | 0.1 | NaOH (1N) | 24 | 8 |
| Example 3, modified polymer C (NR raw material) | 23 | 0.1 | HCl (1N) | 12 | 6.8 |
| Example 4, modified polymer D (NR raw material) | 23 | 0 | NaOH (1N) | 24 | 10 |
| Comparative Example 1 unmodified NR- | — | — | — | — | — |
| Example 5, modified polymer E (SBR raw material) | 23 | 0.1 | NaOH (1N) | 12 | 10 |
| Example 6, modified polymer F (SBR raw material) | 23 | 0.1 | NaOH (1N) | 24 | 8 |
| Example 7, modified polymer G (SBR raw material) | 23 | 0.1 | HCl (1N) | 12 | 6.8 |
| Example 8, modified polymer H (SBR raw material) | 23 | 0 | NaOH (1N) | 24 | 10 |
| Comparative Example 2 unmodified SBR | — | — | — | — | — |
| Example 9, modified polymer I (IR raw material) | 23 | 0.1 | NaOH (1N) | 24 | 10 |
| Example 10, modified polymer J (IR raw material) | 23 | 0.1 | NaOH (1N) | 24 | 8 |
| Example 11, modified polymer K (IR raw material) | 23 | 0.1 | HCl (1N) | 45 | 6.7 |
| Example 12, modified polymer L (IR raw material) | 23 | 0 | NaOH (1N) | 24 | 10 |

TABLE 1-continued

| | | | | | |
|---|---|---|---|---|---|
| Example 13, modified polymer M (IR raw material) | 23 | 0.2 | NaOH (1N) | 30 | 10 |
| Comparative Example 3 modified IR | — | — | | — | — |

| | After recombination | | | Content of linking group (mol %) | | | | |
|---|---|---|---|---|---|---|---|---|
| | Mw ($\times 10^5$) | Mn ($\times 10^5$) | Mw/Mn | Formula (2) | Formula (3) | Formula (4) | Formula (5) | Total |
| Example 1, modified polymer A (NR raw material) | 7.90 | 3.04 | 2.6 | 1.03 | 0.26 | 0 | 0.03 | 1.32 |
| Example 2, modified polymer B (NR raw material) | 14.6 | 6.08 | 2.4 | 2.12 | 0.32 | 0.01 | 0.07 | 2.52 |
| Example 3, modified polymer C (NR raw material) | 5.40 | 1.42 | 3.8 | 0.61 | 0.06 | 0 | 0 | 0.67 |
| Example 4, modified polymer D (NR raw material) | 11.7 | 4.18 | 2.8 | 0.96 | 0.07 | 0.01 | 0.06 | 1.1 |
| Comparative Example 1 unmodified NR | — | — | — | 0 | 0 | 0 | 0 | 0 |
| Example 5, modified polymer E (SBR raw material) | 4.80 | 2.82 | 1.7 | 0 | 0 | 0.61 | 1.22 | 1.83 |
| Example 6, modified polymer F (SBR raw material) | 6.80 | 4.00 | 1.7 | 0 | 0 | 0.39 | 2.35 | 2.74 |
| Example 7, modified polymer G (SBR raw material) | 3.50 | 1.84 | 1.9 | 0 | 0 | 0.07 | 0.67 | 0.74 |
| Example 8, modified polymer H (SBR raw material) | 6.30 | 3.71 | 1.7 | 0 | 0 | 0.48 | 1.09 | 1.57 |
| Comparative Example 2 unmodified SBR | — | — | — | 0 | 0 | 0 | 0 | 0 |
| Example 9, modified polymer I (IR raw material) | 0.75 | 0.63 | 1.2 | 6.79 | 1.02 | 0.11 | 0.30 | 8.23 |
| Example 10, modified polymer J (IR raw material) | 0.88 | 0.73 | 1.2 | 7.81 | 0.91 | 0.10 | 0.26 | 9.08 |
| Example 11, modified polymer K (IR raw material) | 0.76 | 0.63 | 1.2 | 2.34 | 0.32 | 0 | 0.09 | 2.74 |
| Example 12, modified polymer L (IR raw material) | 0.82 | 0.68 | 1.2 | 4.03 | 0.13 | 0.05 | 0.12 | 4.33 |
| Example 13, modified polymer M (IR raw material) | 0.86 | 0.78 | 1.1 | 17.6 | 1.13 | 0.11 | 1.38 | 20.2 |
| Comparative Example 3 modified IR | — | — | — | 0 | 0 | 0 | 0 | 0 |

Examples 14 to 38 and Comparative Examples 4 to 16

Rubber Composition

Using the modified polymers A, B, E and F synthesized above as the modified diene rubber, the rubber compositions were evaluated. In detail, in a first mixing state, other compounding ingredients excluding sulfur and a vulcanization accelerator were added to and kneaded with the rubber components according to the formulations (parts by mass) shown in Tables 2 to 6 below using Banbury mixer (discharge temperature=160° C.), and in a final mixing stage, sulfur and a vulcanization accelerator were add to and kneaded with the kneaded material (discharge temperature=90° C.). Thus, rubber compositions were prepared. The detail of each component in Tables 2 to 6 excluding the rubber component is as follows.

Silica: "Nipsil AQ" (BET=200 m$^2$/g) manufacture by Tosoh Silica Corporation

Carbon black: "SEAST 3" manufactured by Tokai Carbon Co., Ltd.

Silane coupling agent: Bis(3-triethoxysilylpropyl)tetrasulfide, "Si69" manufactured by EVONIK DEGUSSA Zinc flower: "Zinc Flower Type I" manufactured by Mitsui Mining & Smelting Co., Ltd.

Age resister: "NOCRAC 6C" manufactured by Ouchi Shinko Chemical Industrial Co., Ltd.

Stearic acid: "LUNAC S-20" manufactured by Kao Corporation

Process oil: "X-140" manufactured by Japan Energy Corporation

Sulfur: "Powdered sulfur for rubber 150 mesh" manufactured by Hosoi Chemical Industry Co., Ltd.

Vulcanization accelerator: "NOCCELER CZ" manufactured by Ouchi Shinko Chemical Industrial Co., Ltd.

Each rubber composition obtained was vulcanized at 160° C. for 20 minutes to prepare a test piece having a predetermined shape. Using the test piece obtained, a dynamic viscoelasticity test was conducted, and wet skid performance (tan δ (0° C.)) and low fuel consumption performance (tan δ (60° C.)) were evaluated. Additionally, a tensile test was conducted, and elastic modulus M300 and tensile strength were evaluated. Each evaluation method is as follow.

Wet skid performance (tan δ (0° C.)): Using a rheospectrometer E4000 manufactured by USM, loss factor tan δ was measured under the conditions of frequency: 50 Hz, static strain: 10%, dynamic strain: 2% and temperature: 0° C., and was indicated by an index as the value of the corresponding each comparative example (Comparative Examples 4 to 16) being 100. In a rubber composition for a tire, the tan δ at 0° C. is generally used as an index of grip performance (wet skid performance) to a wet road, and indicates that the tan δ is increased as the index is increased, and wet skid performance is excellent.

Low fuel consumption performance (tan δ (60° C.)): The tan δ was measured in the same manner as in the tan δ (0° C.) except for changing the temperature to 60° C., and its inverse value was indicated by an index as the value of the corresponding each comparative example being 100. In a rubber composition for a tire, the tan δ at 60° C. is generally used as an index of low heat generation property. The tan δ is small as the index is increased. Therefore, small tan δ shows that heat is difficult to be generated and low fuel consumption as a tire is excellent.

Elastic modulus M300: Tensile test (dumbbell #3) according to JIS K6251 was conducted to measure 300% modulus, and the value was indicated by an index relative to the value of the corresponding each comparative example being 100. M300 is large and rigidity is high as the index is large.

Tensile strength: Tensile test (dumbbell #3) according to JIS K6251 was conducted to measure strength at break, and the value was indicated by an index relative to the value of the corresponding each comparative example being 100. Tensile strength is high and good as the index is increased.

TABLE 2

| Formulation (parts by mass) | Comparative Example 4 | Example 14 | Example 15 | Comparative Example 5 | Example 16 | Example 17 | Comparative Example 6 | Example 18 | Example 19 | Example 20 |
|---|---|---|---|---|---|---|---|---|---|---|
| Unmodified NR (Comparative Example 1) | 100 | | | | | | 50 | | 50 | |
| Unmodified SBR (Comparative Example 2) | | | | 100 | | | 50 | 50 | | |
| Modified polymer A (NR raw material) | | 100 | | | | | | | | |
| Modified polymer B (NR raw material) | | | 100 | | | | | | 50 | 50 |
| Modified polymer E (SBR raw material) | | | | | 100 | | | | | |
| Modified polymer F (SBR raw material) | | | | | | 100 | | 50 | | 50 |
| Silica | 50 | 50 | 50 | 50 | 50 | 50 | 50 | 50 | 50 | 50 |
| Carbon black | 10 | 10 | 10 | 10 | 10 | 10 | 10 | 10 | 10 | 10 |
| Silane coupling agent | 4 | 4 | 4 | 4 | 4 | 4 | 4 | 4 | 4 | 4 |
| Zinc flower | 2 | 2 | 2 | 2 | 2 | 2 | 2 | 2 | 2 | 2 |
| Process oil | 2 | 2 | 2 | 2 | 2 | 2 | 2 | 2 | 2 | 2 |
| Age resistor | 2 | 2 | 2 | 2 | 2 | 2 | 2 | 2 | 2 | 2 |
| Stearic acid | 2 | 2 | 2 | 2 | 2 | 2 | 2 | 2 | 2 | 2 |
| Sulfur | 2 | 2 | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 | 1.5 | 1.5 |
| Properties (Index) | | | | | | | | | | |
| Low fuel consumption performance | 100 | 135 | 142 | 100 | 128 | 138 | 100 | 120 | 114 | 140 |
| Wet skid performance | 100 | 120 | 124 | 100 | 110 | 114 | 100 | 110 | 110 | 118 |
| Elastic modulus | 100 | 102 | 104 | 100 | 102 | 106 | 100 | 102 | 103 | 104 |
| Tensile strength | 100 | 102 | 105 | 100 | 103 | 106 | 100 | 102 | 102 | 104 |

TABLE 3

| Formulation (parts by mass) | Comparative Example 7 | Example 21 | Example 22 | Example 23 | Comparative Example 8 | Example 24 | Example 25 | Example 26 |
|---|---|---|---|---|---|---|---|---|
| Unmodified NR (Comparative Example 1) | 30 | | 30 | | 70 | | 70 | |
| Unmodified SBR (Comparative Example 2) | 70 | 70 | | | 30 | 30 | | |
| Modified polymer A (NR raw material) | | | | | | | | |
| Modified polymer B (NR raw material) | | 30 | | 30 | | 70 | | 70 |
| Modified polymer E (SBR raw material) | | | | | | | | |
| Modified polymer F (SBR raw material) | | | 70 | 70 | | | 30 | 30 |
| Silica | 50 | 50 | 50 | 50 | 50 | 50 | 50 | 50 |
| Carbon black | 10 | 10 | 10 | 10 | 10 | 10 | 10 | 10 |
| Silane coupling agent | 4 | 4 | 4 | 4 | 4 | 4 | 4 | 4 |
| Zinc flower | 2 | 2 | 2 | 2 | 2 | 2 | 2 | 2 |
| Process oil | 2 | 2 | 2 | 2 | 2 | 2 | 2 | 2 |
| Age resistor | 2 | 2 | 2 | 2 | 2 | 2 | 2 | 2 |
| Stearic acid | 2 | 2 | 2 | 2 | 2 | 2 | 2 | 2 |
| Sulfur | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 |

TABLE 3-continued

| Formulation (parts by mass) | Comparative Example 7 | Example 21 | Example 22 | Example 23 | Comparative Example 8 | Example 24 | Example 25 | Example 26 |
|---|---|---|---|---|---|---|---|---|
| Properties (Index) | | | | | | | | |
| Low fuel consumption performance | 100 | 115 | 125 | 138 | 100 | 127 | 112 | 140 |
| Wet skid performance | 100 | 106 | 110 | 119 | 100 | 112 | 105 | 121 |
| Elastic modulus | 100 | 101 | 102 | 105 | 100 | 102 | 101 | 103 |
| Tensile strength | 100 | 101 | 103 | 105 | 100 | 102 | 101 | 103 |

TABLE 4

| Formulation (parts by mass) | Comparative Example 9 | Example 27 | Example 28 | Example 29 | Comparative Example 10 | Example 30 | Example 31 | Example 32 |
|---|---|---|---|---|---|---|---|---|
| Unmodified NR (Comparative Example 1) | 10 | | 10 | | 90 | | 90 | |
| Unmodified SBR (Comparative Example 2) | 90 | 90 | | | 10 | 10 | | |
| Modified polymer A (NR raw material) | | | | | | | | |
| Modified polymer B (NR raw material) | | 10 | | 10 | | 90 | | 90 |
| Modified polymer E (SBR raw material) | | | | | | | | |
| Modified polymer F (SBR raw material) | | | 90 | 90 | | | 10 | 10 |
| Silica | 50 | 50 | 50 | 50 | 50 | 50 | 50 | 50 |
| Carbon black | 10 | 10 | 10 | 10 | 10 | 10 | 10 | 10 |
| Silane coupling agent | 4 | 4 | 4 | 4 | 4 | 4 | 4 | 4 |
| Zinc flower | 2 | 2 | 2 | 2 | 2 | 2 | 2 | 2 |
| Process oil | 2 | 2 | 2 | 2 | 2 | 2 | 2 | 2 |
| Age resistor | 2 | 2 | 2 | 2 | 2 | 2 | 2 | 2 |
| Stearic acid | 2 | 2 | 2 | 2 | 2 | 2 | 2 | 2 |
| Sulfur | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 |
| Properties (Index) | | | | | | | | |
| Low fuel consumption performance | 100 | 105 | 136 | 139 | 100 | 140 | 103 | 141 |
| Wet skid performance | 100 | 103 | 112 | 116 | 100 | 120 | 103 | 120 |
| Elastic modulus | 100 | 100 | 105 | 106 | 100 | 104 | 100 | 104 |
| Tensile strength | 100 | 101 | 106 | 107 | 100 | 104 | 100 | 105 |

TABLE 5

| Formulation (parts by mass) | Comparative Example 11 | Example 33 | Comparative Example 12 | Example 34 | Comparative Example 13 | Example 35 |
|---|---|---|---|---|---|---|
| Unmodified NR (Comparative Example 1) | 100 | | 100 | | 100 | |
| Modified polymer B (NR raw material) | | 100 | | 100 | | 100 |
| Silica | 15 | 15 | 15 | 15 | 15 | 15 |
| Carbon black | 20 | 20 | 50 | 50 | 70 | 70 |
| Silane coupling agent | 1.2 | 1.2 | 1.2 | 1.2 | 1.2 | 1.2 |
| Zinc flower | 2 | 2 | 2 | 2 | 2 | 2 |
| Process oil | 2 | 2 | 2 | 2 | 2 | 2 |
| Age resistor | 2 | 2 | 2 | 2 | 2 | 2 |
| Stearic acid | 2 | 2 | 2 | 2 | 2 | 2 |
| Sulfur | 2 | 2 | 2 | 2 | 2 | 2 |
| Vulcanization accelerator | 1.5 | 1.5 | 1.5 | 1.5 | 1.5 | 1.5 |
| Properties (Index) | | | | | | |
| Low fuel consumption performance | 100 | 124 | 100 | 150 | 100 | 155 |
| Wet skid performance | 100 | 115 | 100 | 125 | 100 | 130 |
| Elastic modulus | 100 | 102 | 100 | 102 | 100 | 103 |
| Tensile strength | 100 | 103 | 100 | 103 | 100 | 104 |

TABLE 6

| Formulation (parts by mass) | Comparative Example 14 | Example 36 | Comparative Example 15 | Example 37 | Comparative Example 16 | Example 38 |
|---|---|---|---|---|---|---|
| Unmodified SBR (Comparative Example 2) | 100 | | 100 | | 100 | |
| Modified polymer F (SBR raw material) | | 100 | | 100 | | 100 |
| Silica | 20 | 20 | 50 | 50 | 70 | 70 |
| Carbon black | 15 | 15 | 15 | 15 | 15 | 15 |
| Silane coupling agent | 0.8 | 0.8 | 4 | 4 | 5.6 | 5.6 |
| Zinc flower | 2 | 2 | 2 | 2 | 2 | 2 |
| Process oil | 2 | 2 | 2 | 2 | 2 | 2 |
| Age resistor | 2 | 2 | 2 | 2 | 2 | 2 |
| Stearic acid | 2 | 2 | 2 | 2 | 2 | 2 |
| Sulfur | 2 | 2 | 2 | 2 | 2 | 2 |
| Vulcanization accelerator | 1.5 | 1.5 | 1.5 | 1.5 | 1.5 | 1.5 |
| Properties (Index) | | | | | | |
| Low fuel consumption performance | 100 | 120 | 100 | 140 | 100 | 145 |
| Wet skid performance | 100 | 110 | 100 | 120 | 100 | 125 |
| Elastic modulus | 100 | 102 | 100 | 103 | 100 | 105 |
| Tensile strength | 100 | 103 | 100 | 104 | 100 | 105 |

The results are shown in Tables 2 to 6 above. In the rubber compositions of the examples using the modified diene rubber, wet skid performance and low fuel consumption performance were improved as compared with each comparative example as the respective control using unmodified natural rubber or styrene-butadiene rubber. Furthermore, elastic modulus was high and reinforcing property was excellent. That is, rigidity, the wet skid performance and the rolling resistance performance could be simultaneously achieved in high level.

Second Example

Example 39

Synthesis of Modified Polymer N

Natural rubber latex ("HA-NR" manufactured by Regitex Co., Ltd., DRC-60 mass %) and the styrene-butadiene rubber latex ("SBR Latex LX110" manufactured by Zeon Corporation, DRC=50 mass %) used in Example 5 were used as the polymers to be modified. Molecular weight of unmodified natural rubber contained in the natural rubber latex was measured. As a result, a weight average molecular weight was 2,020,000, a number average molecular weigh was 510,000, and a molecular weight distribution was 4.0.

The natural rubber latex and the styrene-butadiene rubber latex were mixed such that a polymer mass ratio is 1:1, and 3.3 g of periodic acid ($H_5IO_6$) was added to 100 g of the mass of a polymer contained in the mixed latex, followed by stirring at 23° C. for 3 hours, thereby decomposing the polymer. The decomposed polymer obtained had a weight average molecular weight of 21,300, a number average molecular weight of 9,100, and a molecular weight distribution of 2.3. Furthermore, pH of a reaction liquid after the decomposition was 6.2.

Thereafter, 0.1 g of pryrrolidine-2-carboxylic acid as a catalyst was added, and 1N sodium hydroxide was added such that pH of the reaction liquid becomes 8, followed by stirring at 23° C. for 24 hours to conduct the reaction. Solid content was precipitated in methanol, washed with water, and dried at 30° C. for 24 hours by a hot air circulation type drier. Thus, modified polymer N in a solid state at the ordinary temperature was obtained.

The modified polymer N obtained is a modified diene rubber having the linking groups represented by the formulae (2) to (5) in the molecule and in which the polyisoprene chain represented by the formula (8) and the styrene-butadiene copolymer chain represented by the formula (9) are linked through the linking groups. As shown in Table 7 below, the modified polymer N had a weight average molecular weight Mw of 1,620,000, a number average molecular weight of 500,000, a molecular weight distribution Mw/Mn of 3.2, and the content of the linking groups of 1.3 mol % for the formula (2), 0.4 mol % for the formula (3), 0.2 mol % for the formula (4) and 0.4 mol % for the formula (5), the total content being 2.3 mol %. Thus, from the facts that the peak of the linking group was confirmed by NMR and a glass transition temperature was unified by differential scanning colorimetry (DSC), "DSC-822e" manufactured by METTLER, it is apparent that copolymerization was performed, that is, main chains were exchanged (the same is applied to the following modified copolymers 0 to S).

Example 40

Synthesis of Modified Polymer O

The natural rubber latex and styrene-butadiene rubber latex used in Example 39 were separately subjected to an oxidative decomposition reaction, and those were then mixed to conduct a recombination reaction. In detail, 1.65 g of periodic acid was added to 50 g of the mass of a polymer in the natural rubber latex, followed by stirring at 23° C. for 3 hours. The decomposed polymer obtained had a weight average molecular weight of 13,500, a number average molecular weight of 5,300 and a molecular weight distribution of 2.6. The pH of the reaction liquid after the decomposition was 6.4. On the other hand, 1.65 g of periodic acid was added to 50 g of the mass of a polymer in the styrene-butadiene rubber latex, followed by stirring at 23° C. for 3 hours. The decomposed polymer obtained had a weight average molecular weight of 3,630, a number average molecular weight of 2,400 and a molecular weight distribution of 1.5. The pH of the reaction liquid after the decomposition was 6.1.

Those latexes after the decomposition reaction were mixed such that polymer mass ratio is 1:1. The pH of the mixed liquid was 6.2. Thereafter, 0.1 g of pyrrolidine-2-carboxylic acid as a catalyst was added to 100 g of the polymer mass, 1N sodium hydroxide was added such that the pH of the reaction liquid is 8, followed by stirring at 23° C. for 24 hours, thereby performing a recombination reaction. Thereafter, precipitation, washing and drying were conducted in the same manners as in Example 39, and a modified polymer O in a solid state at the ordinary temperature was obtained.

Similar to the modified polymer N, the modified polymer O obtained was a modified diene rubber having the linking groups represented by the formulae (2) to (5) in the molecule and in which the polyisoprene chain represented by the formula (8) and the styrene-butadiene copolymer chain represented by the formula (9) are linked through the linking groups. As shown in Table 7 below, the modified polymer O had a weight average molecular weight Mw of 1,510,000, a number average molecular weight of 490,000, a molecular weight distribution Mw/Mn of 3.1, and the content of the linking groups of 1.0 mol % for the formula (2), 0.3 mol % for the formula (3), 0.2 mol % for the formula (4) and 0.5 mol % for the formula (5), the total content being 2.0 mol %.

Comparative Example 17

Preparation of Unmodified Polymer Blend 1

The natural rubber latex and styrene-butadiene rubber latex used in Example 39 were mixed such that a polymer mass ratio is 1:1, the resulting mixed liquid was subjected to precipitation in methanol, and the resulting precipitate was washed with water, and dried at 30° C. for 24 hours by a hot air circulation type drier. Thus, an unmodified polymer blend 1 was obtained.

Example 41

Preparation of Modified Polymer Blend 1

The natural rubber latex and styrene-butadiene rubber latex used in Example 39 were separately subjected to oxidative cleavage and recombination reaction, and then mixed. In detail, similar to Example 40, periodic acid was added to the natural rubber latex and the styrene-butadiene rubber latex, respectively, to conduct an oxidative decomposition reaction. Thereafter, 0.05 g of pyrrolidine-2-carboxylic acid was added to the natural rubber latex and the styrene-butadiene rubber latex, respectively, 1N sodium hydroxide was added such that pH of the reaction liquid becomes 8, followed by stirring at 23° C. for 24 hours, thereby conducting the recombination reaction, respectively. The natural rubber after the recombination had a weight average molecular weight Mw of 1,850,000, a number average molecular weight Mn of 498,000, and a molecular weight distribution of 3.71. The styrene-butadiene rubber after the recombination had a weight average molecular weight Mw of 490,000, a number average molecular weight Mn of 279,000, and a molecular weight distribution of 1.73. After the recombination reaction, those latexes are mixed such that a polymer mass ratio is 1:1, and the resulting mixture was subjected to precipitation in methanol. The resulting precipitate was washed with water, and then dried at 30° C. for 24 hours by a hot air circulation type drier. Thus, a modified blend 1 was obtained.

As a result of examining the content of the linking groups in the modified polymer blend 1 obtained, the formula (2) was 1.0 mol %, the formula (3) was 0.3 mol %, the formula (4) was 0.3 mol %, the formula (5) was 0.6 mol %, and the total of those was 2.2 mol %.

Example 42

Synthesis of Modified Polymer P

A modified polymer P in a solid state at the ordinary temperature was obtained in the same manner as in Example 39, except that the polymer mass ratio in mixing the natural rubber latex and the styrene-butadiene rubber latex was 2:1.

Example 43

Synthesis of Modified Polymer Q

A modified polymer Q in a solid state at the ordinary temperature was obtained in the same manner as in Example 40, except that the polymer mass ratio in mixing the natural rubber latex and the styrene-butadiene rubber latex after the oxidative decomposition reaction was 2:1.

Comparative Example 18

Preparation of Unmodified Polymer Blend 2

An unmodified polymer blend 2 was obtained in the same manner as in Comparative Example 17, except that the polymer mass ratio in mixing the natural rubber latex and the styrene-butadiene rubber latex was 2:1.

Example 44

Preparation of Modified Polymer Blend 2

A modified polymer blend 2 was obtained in the same manner as in Example 41, except that the polymer mass ratio in mixing the natural rubber latex and the styrene-butadiene rubber latex after the recombination reaction was 2:1. The content of each linking group in the modified polymer blend 2 obtained is shown in Table 7.

Example 45

Synthesis of Modified Polymer R

A modified polymer R in a solid state at the ordinary temperature was obtained in the same manner as in Example 39, except that the addition amount of periodic acid during the oxidative decomposition reaction, the pH regulator added during the recombination reaction, and the pH were changed as shown in Table 7.

Example 46

Synthesis of Modified Polymer S

A modified polymer S in a solid state at the ordinary temperature was obtained in the same manner as in Example 40, except that the addition amount of periodic acid during the oxidative decomposition reaction, the pH regulator added during the recombination reaction, and the pH were changed as shown in Table 7.

Example 47

Preparation of Modified Polymer Blend 3

A modified polymer blend 3 in a solid state at the ordinary temperature was obtained in the same manner as in Example 41, except that the addition amount of periodic acid during the oxidative decomposition reaction, the pH regulator added during the recombination reaction, and the pH were changed as shown in Table 7. The content of each linking group in the modified polymer blend 3 obtained is shown in Table 7.

The modified polymers P, Q, R and S are modified diene rubbers having the linking groups represented by the formulae (2) to (5) and in which the polyisoprene chain represented by the formula (8) and the styrene-butadiene copolymer chain represented by the formula (9) are linked through the linking groups, and Mw, Mn, Mw/Mn, and content of each linking group are shown in Table 7.

TABLE 7

| | Polymer before modification NR | | | Polymer before modification SBR | | | | | Oxidative decomposition reaction condition | |
|---|---|---|---|---|---|---|---|---|---|---|
| | Mw (×10⁵) | Mn (×10⁵) | Mw/Mn | Mw (×10⁵) | Mn (×10⁵) | Mw/Mn | NR:SBR | Synthesis method | Amount of periodic acid (g) | Reaction time (hour) |
| Unmodified polymer blend 1 | 20.2 | 5.1 | 4.0 | 6.8 | 3.2 | 2.1 | 1:1 | Mixing without modification | — | — |
| Modified polymer blend 1 | 20.2 | 5.1 | 4.0 | 6.8 | 3.2 | 2.1 | 1:1 | Mixing after combining reaction | NR: 1.65 SBR: 1.65 | NR: 3 SBR: 3 |
| Modified polymer N | 20.2 | 5.1 | 4.0 | 6.8 | 3.2 | 2.1 | 1:1 | Mixing before decomposition reaction | 3.3 | 3 |
| Modified polymer O | 20.2 | 5.1 | 4.0 | 6.8 | 3.2 | 2.1 | 1:1 | Mixing after decomposition reaction | NR: 1.65 SBR: 1.65 | NR: 3 SBR: 3 |
| Unmodified polymer blend 2 | 20.2 | 5.1 | 4.0 | 6.8 | 3.2 | 2.1 | 2:1 | Mixing without modification | — | — |
| Modified polymer blend 2 | 20.2 | 5.1 | 4.0 | 6.8 | 3.2 | 2.1 | 2:1 | Mixing after combining reaction | NR: 2.2 SBR: 1.1 | NR: 3 SBR: 3 |
| Modified polymer P | 20.2 | 5.1 | 4.0 | 6.8 | 3.2 | 2.1 | 2:1 | Mixing before decomposition reaction | 3.3 | 3 |
| Modified polymer Q | 20.2 | 5.1 | 4.0 | 6.8 | 3.2 | 2.1 | 2:1 | Mixing after decomposition reaction | NR: 2.2 SBR: 1.1 | NR: 3 SBR: 3 |
| Modified polymer blend 3 | 20.2 | 5.1 | 4.0 | 6.8 | 3.2 | 2.1 | 1:1 | Mixing after combining reaction | NR: 0.55 SBR: 0.55 | NR: 3 SBR: 3 |
| Modified polymer R | 20.2 | 5.1 | 4.0 | 6.8 | 3.2 | 2.1 | 1:1 | Mixing before decomposition reaction | 1.1 | 3 |
| Modified polymer S | 20.2 | 5.1 | 4.0 | 6.8 | 3.2 | 2.1 | 1:1 | Mixing after decomposition reaction | NR: 0.55 SBR: 0.55 | NR: 3 SBR: 3 |

| | After decomposition | | | | Combining reaction condition | | | After combining |
|---|---|---|---|---|---|---|---|---|
| | Mw (×10³) | Mn (×10³) | Mw/Mn | pH | Amount of pyrrolidine-2-carboxylic acid (g) | pH regulator | pH | Mw (×10⁵) |
| Unmodified polymer blend 1 | — | — | — | — | — | — | — | — |
| Modified polymer blend 1 | NR: 13.5 SBR: 3.63 | NR: 5.3 SBR: 2.4 | NR: 2.6 SBR: 1.5 | NR: 6.4 SBR: 6.1 | NR: 0.05 SBR: 0.05 | NR: NaOH SBR: NaOH | NR: 8 SBR: 8 | NR: 18.5 SBR: 4.9 |
| Modified polymer N | 21.3 | 9.1 | 2.3 | 6.2 | 0.1 | NaOH | 8 | 16.2 |
| Modified polymer O | NR: 13.5 SBR: 3.63 | NR: 5.3 SBR: 2.4 | NR: 2.6 SRB: 1.5 | NR: 6.4 SBR: 6.1 | 0.1 | NaOH | 8 | 15.1 |
| Unmodified polymer blend 2 | — | — | — | — | — | — | — | — |
| Modified polymer blend 2 | NR: 13.5 SBR: 3.63 | NR: 5.3 SBR: 2.4 | NR: 2.6 SBR: 1.5 | NR: 6.4 SBR: 6.1 | NR: 0.067 SBR: 0.033 | NR: NaOH SBR: NaOH | NR: 8 SBR: 8 | NR: 18.5 SBR: 4.9 |
| Modified polymer P | 19.2 | 8.9 | 2.2 | 6.3 | 0.1 | NaOH | 8 | 17.3 |
| Modified polymer Q | NR: 13.5 SBR: 3.63 | NR: 5.3 SBR: 2.4 | NR: 2.6 SBR: 1.5 | NR: 6.4 SBR: 6.1 | 0.1 | NaOH | 8 | 16.2 |
| Modified polymer blend 3 | NR: 23.5 SBR: 7.21 | NR: 6.2 SBR: 4.0 | NR: 3.8 SBR: 1.8 | NR: 7.8 SBR: 8.0 | NR: 0.05 SBR: 0.05 | NR: HCl SBR: HCl | NR: 6 SBR: 6 | NR: 17.9 SBR: 5.1 |
| Modified polymer R | 51.1 | 20.4 | 2.5 | 8.0 | 0.1 | HCl | 6 | 15.9 |
| Modified polymer S | NR: 23.5 SBR: 7.21 | NR: 6.2 SBR: 4.0 | NR: 3.8 SBR: 1.8 | NR: 7.8 SBR: 8.0 | 0.1 | HCl | 6 | 15.2 |

| | After combining | | Content of linking group (mol %) | | | | |
|---|---|---|---|---|---|---|---|
| | Mn (×10⁵) | Mw/Mn | Formula (2) | Formula (3) | Formula (4) | Formula (5) | Total |
| Unmodified polymer blend 1 | — | — | 0.0 | 0.0 | 0.0 | 0.0 | 0.0 |
| Modified polymer blend 1 | NR: 5.0 SBR: 2.8 | NR: 3.7 SBR: 1.7 | 1.0 | 0.3 | 0.3 | 0.6 | 2.2 |
| Modified polymer N | 5.0 | 3.2 | 1.3 | 0.4 | 0.2 | 0.4 | 2.3 |

TABLE 7-continued

| | | | | | | | |
|---|---|---|---|---|---|---|---|
| Modified polymer O | 4.9 | 3.1 | 1.0 | 0.3 | 0.2 | 0.5 | 2.0 |
| Unmodified polymer blend 2 | — | — | 0.0 | 0.0 | 0.0 | 0.0 | 0.0 |
| Modified polymer blend 2 | NR: 5.0 SBR: 2.8 | NR: 3.7 SBR: 1.7 | 1.3 | 0.2 | 0.2 | 0.4 | 2.0 |
| Modified polymer P | 4.8 | 3.6 | 1.6 | 0.2 | 0.1 | 0.2 | 2.1 |
| Modified polymer Q | 4.7 | 3.5 | 1.3 | 0.2 | 0.1 | 0.2 | 1.8 |
| Modified polymer blend 3 | NR: 4.7 SBR: 2.9 | NR: 3.8 SBR: 1.8 | 0.5 | 0.1 | 0.1 | 0.2 | 0.9 |
| Modified polymer R | 4.7 | 3.4 | 0.6 | 0.1 | 0.1 | 0.2 | 1.0 |
| Modified polymer S | 4.8 | 3.2 | 0.5 | 0.1 | 0.1 | 0.2 | 0.9 |

Examples 48 to 56 and Comparative Examples 19 to 21

Rubber Composition

Banbury mixer was used, and according to the formulations (parts by mass) shown in Tables 8 to 10 below, other compounding ingredients excluding sulfur and a vulcanization accelerator were added to and kneaded with a rubber component in a first mixing step. Sulfur and a vulcanization accelerator were added to and kneaded with the kneaded material obtained, in a final mixing stage, thereby preparing a rubber composition. The detail of each component in Tables 8 to 10 excluding a rubber component is the same as in First Example above.

Each rubber composition obtained was vulcanized at 160° C. for 20 minutes to prepare a test piece having a desired shape. Using the test piece obtained, a dynamic viscoelasticity test was conducted, and wet skid performance (tan δ (0° C.)) and low fuel consumption performance (tan δ (60° C.)) were evaluated in the same manner as in First Example above. Additionally, a tensile test was conducted, and elastic modulus M300 and tensile strength were evaluated. The measurement values in each evaluation test were indicated by indexes relative to the value of Comparative Example 19 being 100 in Table 8, the value of Comparative Example 20 being 100 in Table 9, and the value of Comparative Example 21 being 100 in Table 10.

TABLE 8

| Formulation (parts by mass) | Comparative Example 19 | Example 48 | Example 49 | Example 50 |
|---|---|---|---|---|
| Unmodified polymer blend 1 | 100 | | | |
| Modified polymer blend 1 | | 100 | | |
| Modified polymer N | | | 100 | |
| Modified polymer O | | | | 100 |
| Silica | 50 | 50 | 50 | 50 |
| Carbon black | 10 | 10 | 10 | 10 |
| Silane coupling agent | 4 | 4 | 4 | 4 |
| Zinc flower | 2 | 2 | 2 | 2 |
| Process oil | 2 | 2 | 2 | 2 |
| Age resister | 2 | 2 | 2 | 2 |
| Stearic acid | 2 | 2 | 2 | 2 |
| Sulfur | 2 | 2 | 2 | 2 |
| Vulcanization accelerator | 1.5 | 1.5 | 1.5 | 1.5 |
| Properties (index) | | | | |
| Low fuel consumption performance | 100 | 137 | 148 | 144 |
| Wet skid performance | 100 | 117 | 118 | 118 |
| Elastic modulus | 100 | 103 | 102 | 102 |
| Tensile strength | 100 | 103 | 108 | 106 |

TABLE 9

| Formulation (parts by mass) | Comparative Example 20 | Example 51 | Example 52 | Example 53 |
|---|---|---|---|---|
| Unmodified polymer blend 2 | 100 | | | |
| Modified polymer blend 2 | | 100 | | |
| Modified polymer P | | | 100 | |
| Modified polymer Q | | | | 100 |
| Silica | 50 | 50 | 50 | 50 |
| Carbon black | 10 | 10 | 10 | 10 |
| Silane coupling agent | 4 | 4 | 4 | 4 |
| Zinc flower | 2 | 2 | 2 | 2 |
| Process oil | 2 | 2 | 2 | 2 |
| Age resister | 2 | 2 | 2 | 2 |
| Stearic acid | 2 | 2 | 2 | 2 |
| Sulfur | 2 | 2 | 2 | 2 |
| Vulcanization accelerator | 1.5 | 1.5 | 1.5 | 1.5 |
| Properties (index) | | | | |
| Low fuel consumption performance | 100 | 140 | 149 | 145 |
| Wet skid performance | 100 | 119 | 120 | 116 |
| Elastic modulus | 100 | 103 | 101 | 101 |
| Tensile strength | 100 | 104 | 109 | 107 |

TABLE 10

| Formulation (parts by mass) | Comparative Example 21 | Example 54 | Example 55 | Example 56 |
|---|---|---|---|---|
| Unmodified polymer blend 1 | 100 | | | |
| Modified polymer blend 3 | | 100 | | |
| Modified polymer R | | | 100 | |
| Modified polymer S | | | | 100 |
| Silica | 50 | 50 | 50 | 50 |
| Carbon black | 10 | 10 | 10 | 10 |
| Silane coupling agent | 4 | 4 | 4 | 4 |
| Zinc flower | 2 | 2 | 2 | 2 |
| Process oil | 2 | 2 | 2 | 2 |
| Age resister | 2 | 2 | 2 | 2 |
| Stearic acid | 2 | 2 | 2 | 2 |
| Sulfur | 2 | 2 | 2 | 2 |
| Vulcanization accelerator | 1.5 | 1.5 | 1.5 | 1.5 |
| Properties (index) | | | | |
| Low fuel consumption performance | 100 | 121 | 125 | 124 |
| Wet skid performance | 100 | 115 | 116 | 114 |
| Elastic modulus | 100 | 102 | 102 | 102 |
| Tensile strength | 100 | 103 | 108 | 108 |

The results are shown in Tables 8 to 10. Examples 48, 51 and 54 are as follows. Modified polymers obtained by subjecting natural rubber and styrene-butadiene rubber to oxidative cleavage, respectively, and then recombining are blended, and the resulting blend is used. Therefore, each modified polymer has the linking groups represented by the formulae (2) to (5). As a result, those examples were excellent in low fuel consumption and wet skid performance as compared with Comparative Examples 19 to 21 in which unmodified rubbers that do not have such linking groups were blended and the resulting blend was used. In Examples 49, 50, 52, 53, 55 and 56, a modified diene rubber having the linking groups and in which different kinds of dine polymer chains were recombined by a main chain exchange reaction was used. As a result, those examples were improved in the balance between low fuel consumption and wet skid performance as compared with Examples 48, 51 and 54 using a blend of modified polymers, as well as Comparative Examples 19 to 21 using an unmodified rubber blend. Furthermore, in Examples 48 to 56, elastic modulus is high and reinforcing property is excellent. As a result, reinforcing property, wet skid performance and rolling resistance performance could be simultaneously achieved in high level.

INDUSTRIAL APPLICABILITY

The modified polymer according to the present invention can be used as a polymer component that is compounded with various polymer compositions including a rubber composition.

The invention claimed is:

1. A process for producing a modified polymer, comprising decomposing a polymer having a carbon-carbon double bond in a main chain by subjecting the carbon-carbon double bond to oxidative cleavage to decrease a molecular weight, and
combining polymer chains of the decomposed polymer by changing acido-basic properties such that a system containing the decomposed polymer becomes basic when acidic, and becomes acidic when basic, thereby obtaining a modified polymer in which the structure has been changed.

2. The process for producing a modified polymer according to claim 1, wherein the polymer before decomposition having a carbon-carbon double bond in a main chain has a number average molecular weight of 60,000 or more, and the modified polymer after combining has a number average molecular weight of 60,000 or more.

3. The process for producing a modified polymer according to claim 1, wherein the decomposed polymer contains a structure represented by the following formula (1) at a terminal:

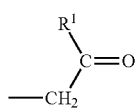

(1)

wherein $R^1$ represents a hydrogen atom, an alkyl group having from 1 to 5 carbon atoms, or a halogen group.

4. The process for producing a modified polymer according to claim 1, wherein the modified polymer has at least one linking group selected from the group consisting of linking groups represented by the following formulae (2) to (5) in the molecule

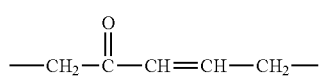

(2)

-continued

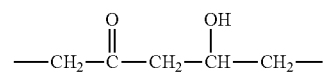

(3)

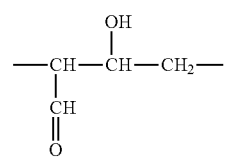

(4)

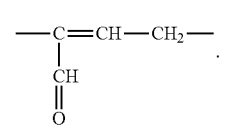

(5)

5. The process for producing a modified polymer according to claim 1, wherein the carbon-carbon double bond is subjected to oxidative cleavage using periodic acid.

6. The process for producing a modified polymer according to claim 1, wherein the reaction system is an aqueous emulsion.

7. The process for producing a modified polymer according to claim 1, wherein two kinds or more of polymers having a carbon-carbon double bond in a main chain are decomposed by the oxidative cleavage to decrease the molecular weight.

8. The process for producing a modified polymer according to claim 7, wherein the modified polymer is a composite polymer having polymer chains derived from two kinds or more of the polymers.

9. The process for producing a modified polymer according to claim 1, wherein the polymer having a carbon-carbon double bond in the main chain is a diene rubber polymer.

10. The process for producing a modified polymer according to claim 9, wherein the diene rubber polymer is at least one selected from the group consisting of a styrene-butadiene rubber, a natural rubber and a synthetic isoprene rubber.

11. A modified polymer obtained by the production method according to claim 1.

12. A diene polymer having at least one linking group selected from the group consisting of linking groups represented by the following formulae (2) to (5) in the molecule, having a structure in which diene polymer chains are linked through the linking group, and having a number average molecular weight of from 60,000 to 1,000,000

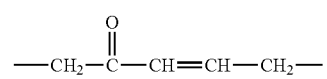

(2)

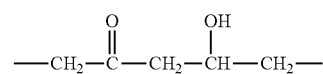

(3)

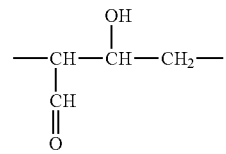

(4)

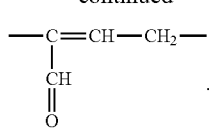
(5)

13. The diene polymer according to claim 12, which is a modified isoprene rubber having at least one linking group selected from the group consisting of the linking groups represented by the formulae (2) to (5) in the molecule, and in which polyisoprene chains represented by the following formula (8) are linked through the linking group:

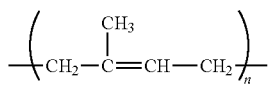
(8)

wherein n is an integer of 1 or more.

14. The diene polymer according to claim 12, which is a modified styrene-butadiene rubber having at least one linking group selected from the group consisting of the linking groups represented by the formulae (4) and (5) in the molecule, and in which random copolymer chains represented by the following formula (9) are linked through the linking groups:

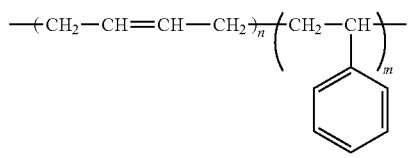
(9)

wherein n and m each independently are an integer of 1 or more.

15. The diene polymer according to claim 12, having a structure in which different kinds of the diene polymer chains are linked through the linking group.

16. The diene polymer according to claim 15, wherein the different kinds of the diene polymer chains contain at least one of a polyisoprene chain represented by the following formula (8), a random copolymer chain represented by the following formula (9) or a polybutadiene chain represented by the following formula (10):

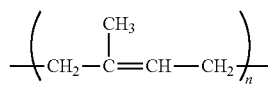
(8)

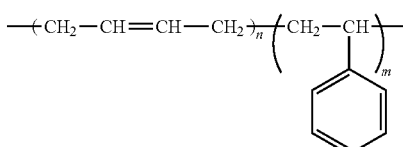
(9)

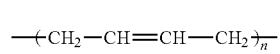
(10)

wherein n and m each independently are an integer of 1 or more.

17. The diene polymer according to claim 16, having a structure in which at least two kinds selected from the group consisting of the polyisoprene chain, the random copolymer chain and the polybutadiene chain are linked through the linking group.

18. A rubber composition comprising 100 parts by mass of a rubber component containing the diene polymer according to claim 12, and from 5 to 150 parts by mass of a filler.

19. A pneumatic tire comprising the rubber composition according to claim 18.

20. A pneumatic tire comprising the rubber composition according to claim 18 as a tread.

* * * * *